C. FLÜGEL.
TIRE CHAIN ATTACHMENT DEVICE.
APPLICATION FILED MAR. 10, 1920.
1,426,268.
Patented Aug. 15, 1922.
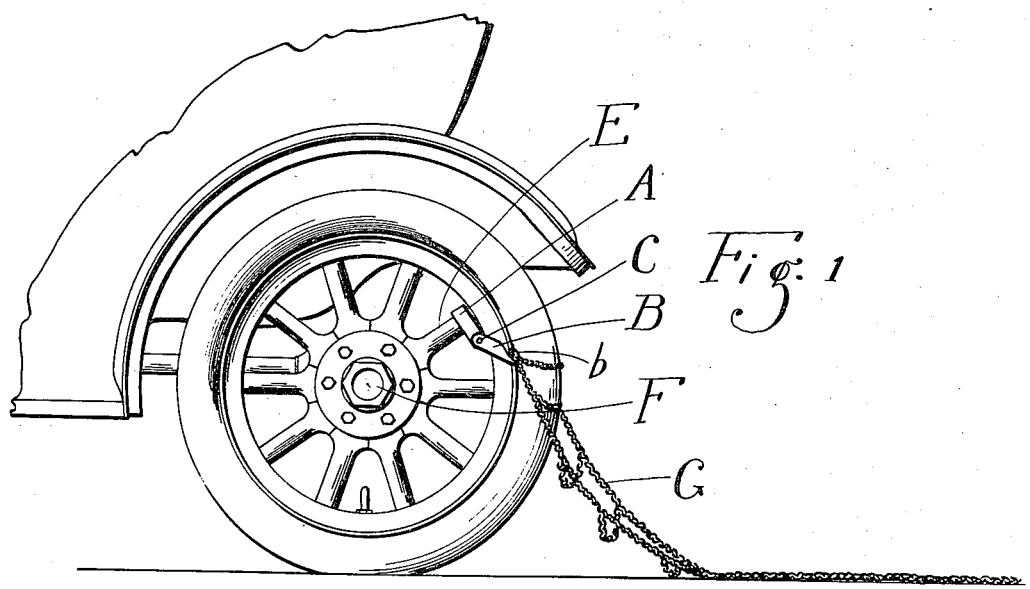
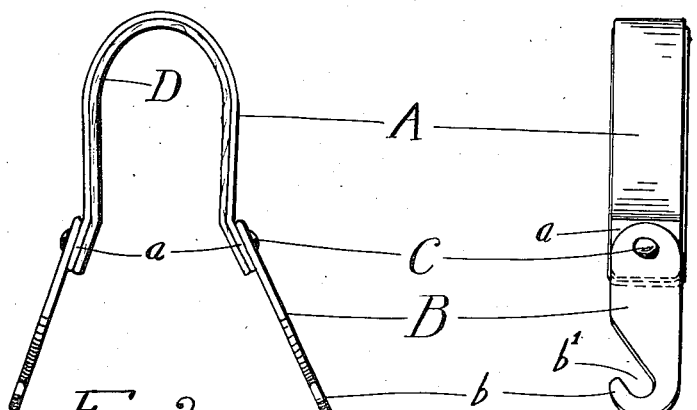
Inventor
Clifford Flügel
By Walter F. Murray
Attorney

UNITED STATES PATENT OFFICE.

CLIFFORD FLUGEL, OF CINCINNATI, OHIO.

TIRE-CHAIN-ATTACHMENT DEVICE.

1,426,268.   Specification of Letters Patent.   Patented Aug. 15, 1922.

Application filed March 10, 1920. Serial No. 364,819.

*To all whom it may concern:*

Be it known that I, CLIFFORD FLUGEL, a citizen of the United States of America, and a resident of Cincinnati, in the county of Hamilton and State of Ohio, have invented a new and useful Improvement in Tire-Chain-Attachment Devices, of which the following is a specification.

An object of my invention is to provide a device to be used in applying chains on a tire that will apply the chains evenly.

Another object is to provide a device for this purpose that will be simple of construction and operation.

Another object is to provide such a device that will not mar the spokes of the wheel when used.

These and other objects are attained by the means described herein and disclosed in the accompanying drawing, in which:—

Fig. 1, is a side view of an automobile wheel and of a device embodying my invention, in operation.

Fig. 2, is an end view on an enlarged scale of a device embodying my invention.

Fig. 3, is a side view of the device shown in Fig. 2.

My invention is of a U-shaped clip adapted to be seated upon a spoke of a wheel and having chain engaging hooks or fingers that hold the chain and draw it about the tire as the wheel is revolved.

The U clip A comprises a strap in which the diameter of the curved or rounded part is of a width that will firmly secure the clip upon a wheel spoke. The neck or open end of the clip can be sprung over the spoke. Outwardly projecting arms $a$, formed on each end of the strap, form a mouth sufficiently wide to easily snap the clip upon the spoke. To these arms are attached fingers B by means of pivots C. At the end of each finger is formed a hook $b$, both hooks having their throat $b'$ on the same side of the clip. The pivots permit adjustment of the fingers in relation to the clip. A layer of felt or other padding material D is attached to the inside surface of the clip A.

In operation the U clip is snapped over a spoke E of a wheel F, so that the fingers B extend rearward and so that the throats $b'$ of the hooks are upward, as shown in Fig. 1. The first link of the adjacent ends of one skid chain are caught on the hooks. As the wheel is revolved, or as the vehicle moves forward, the chains are evenly and expeditiously applied. When the wheel has made one complete revolution, the two ends of the same chain are fastened together, and the device disengaged from the spoke. By employing a device embodying my invention, the chains may be applied without jacking up the wheel.

Having thus described my invention, what I claim is:—

An anti-skid chain applying device comprising a U clip adapted to engage a wheel spoke, arms formed on the clip, fingers pivotally attached to the arms and hooks formed on the fingers adapted to engage an anti-skid chain.

In witness whereof, I have hereunto subscribed my name, this 9th day of March, 1920.

CLIFFORD FLUGEL.